United States Patent

[11] 3,585,513

| [72] | Inventor | Alfred R. Lucas Northbrook, Ill. |
|---|---|---|
| [21] | Appl. No. | 821,291 |
| [22] | Filed | May 2, 1969 |
| [45] | Patented | June 15, 1971 |
| [73] | Assignee | Motorola, Inc. Franklin Park, Ill. |

[54] FREQUENCY MODULATION DISCRIMINATOR HAVING FIRST BRANCH WITH RESONATOR AND SECOND BRANCH PROVIDING VOLTAGE AND TEMPERATURE COMPENSATION
9 Claims, 2 Drawing Figs.

[52] U.S. Cl. .................................................. 329/117, 307/320, 329/136, 329/140
[51] Int. Cl. .................................................. H03d 3/26, H03d 3/28
[50] Field of Search .................................................. 329/110, 117, 119, 131, 134, 136, 129, 130, 140—143; 307/310; 325/347, 349, 475, 476; 328/3

[56] References Cited
UNITED STATES PATENTS

| 2,710,350 | 6/1955 | Van Dijkum | 329/130 |
| 2,712,600 | 7/1955 | Beckwith | 329/143 X |
| 2,724,089 | 11/1955 | Ruston | 329/140 X |
| 2,913,580 | 11/1959 | Kosowsky | 329/117 |
| 3,044,025 | 7/1962 | McCauley | 307/310 X |
| 3,108,230 | 10/1963 | Hurtig | 329/117 |
| 3,160,822 | 12/1964 | Dix | 325/349 |
| 3,348,158 | 10/1967 | Dennis | 307/310 X |

*Primary Examiner*—Alfred L. Brody
*Attorney*—Mueller & Aichele

ABSTRACT: A discriminator for a frequency modulated receiver, having slope detector and reference portions, with each portion developing a signal from the input signal. The slope detector portion signal varies in accordance with the frequency and amplitude of the input signal, and varies with temperature. The reference portion signal varies in accordance with the amplitude of the input signal and also varies in accordance with temperature. Signals from the two portions are combined at the output to produce a resultant signal which varies in amplitude according to the frequency of the input signal and is substantially unaffected by temperature variations and changes in supply voltage.

PATENTED JUN15 1971 3,585,513

Inventor
ALFRED R. LUCAS

BY Mueller, Aichele & Rauner
ATTYS.

FREQUENCY MODULATION DISCRIMINATOR HAVING FIRST BRANCH WITH RESONATOR AND SECOND BRANCH PROVIDING VOLTAGE AND TEMPERATURE COMPENSATION

BACKGROUND OF THE INVENTION

In portable and mobile frequency modulated communication receivers where the circuitry is condensed into a small volume, Foster-Seeley and ratio detector discriminators are undesirable because the high level electromagnetic field produced by the coils associated with these discriminators adversely affects other portions of the communications receiver. A slope detector-type of discriminator employing a crystal or ceramic resonator is preferable because no inductors through which the main signal energy is transferred are required in the circuitry. The voltage at the output of a slope detector varies with the change in frequency of the input signal and has a particular voltage level at the center frequency of the input signal, dependent on the amplitude of the signal. The amplitude of the input signal will vary in accordance with the supply voltage, and in portable communication receivers this variation can be as much as 3 volts. The output voltage at the center frequency of the input signal can therefore, vary by this same amount. It is desirable to have a stable voltage level at the output of the discriminator (usually zero volts) for ease in adjustment and maintenance of the communication receiver. A zero voltage level can be established by combining the detector output voltage with a voltage established by using resistive dividers or diodes. This reference voltage, however, is also subject to variations in the supply voltage.

Ceramic or crystal resonators used in slope detectors are selected such that their response is linear over the frequency range of applied signals. However, this response may not remain linear under extreme temperature variations such as are ordinarily encountered in mobile and portable communication receivers. Nonlinear response will cause severe distortion of the receiver audio output signal. It is, therefore, necessary to provide some means to compensate for the nonlinear variations with temperature of the resonator employed in the slope detector.

SUMMARY OF THE INVENTION

It is an object of this invention to provide a slope detector frequency modulation discriminator which has no coils through which the main signal energy is transferred.

It is another object of this invention to provide a slope detector discriminator having a zero voltage level output at the center frequency of the input signal, and wherein such output voltage at the center frequency remains constant with variations in power supply voltage.

It is yet another object of this invention to provide a slope detector discriminator in which the variations in output voltage of the discriminator due to modulation of the input signal remains linear with variations in temperature.

A feature of this invention is the provision of a slope detector discriminator having a portion for developing a reference voltage from the signal input which is combined with the voltage derived from the slope detector.

A further feature of the invention is a provision of a circuit providing a reference voltage which varies with temperature to compensate for voltage variations in the slope detector output voltage resulting from temperature effects on the resonator of the slope detector.

In practicing this invention a discriminator is provided having a slope detector portion including a piezoelectric resonator such as a ceramic resonator, and a reference portion connected in parallel with the slope detector portion to the signal input. Frequency modulated input signals having a particular center frequency, are coupled to the slope detector to develop a signal across the resonator which varies in amplitude and has a particular output amplitude at the center frequency of the input signal which is proportional to the amplitude of the input signal. The amplitude variations about this particular output amplitude are proportional to the modulation of the input signal. Input signals coupled to the reference portion of the discriminator also develop a signal proportional to the amplitude of the input signal and opposite in sign to the signal developed in the slope detector. The signals developed in the slope detector portion and in the reference portion are combined at the output to produce a voltage having a zero voltage level at the particular center frequency of the input signal, and which varies in amplitude in proportion to the modulation of the frequency modulated input signal. Variations in power supply voltage do not affect the zero voltage output level, because it is established by differential comparison of voltages derived from the same input signal source.

Adjustments to compensate for component tolerances, and obtain an exact zero voltage level at the particular center frequency may be made by adjusting a potentiometer in the voltage reference portion. Variations in output signal of the slope detector, due to variations in ambient temperature, are compensated for by a temperature sensitive resistor in the voltage reference portion which varies the output signal of the voltage reference portion with temperature. The result is a slope detector discriminator with a zero voltage output at the particular center frequency of the input signal, whose output voltage varies substantially linearly with the modulation of the frequency modulated input signal, and is substantially unaffected by changes in temperatures and by variations in the power supply voltage.

DESCRIPTION OF THE PREFERRED EMBODIMENT

Figure 1:
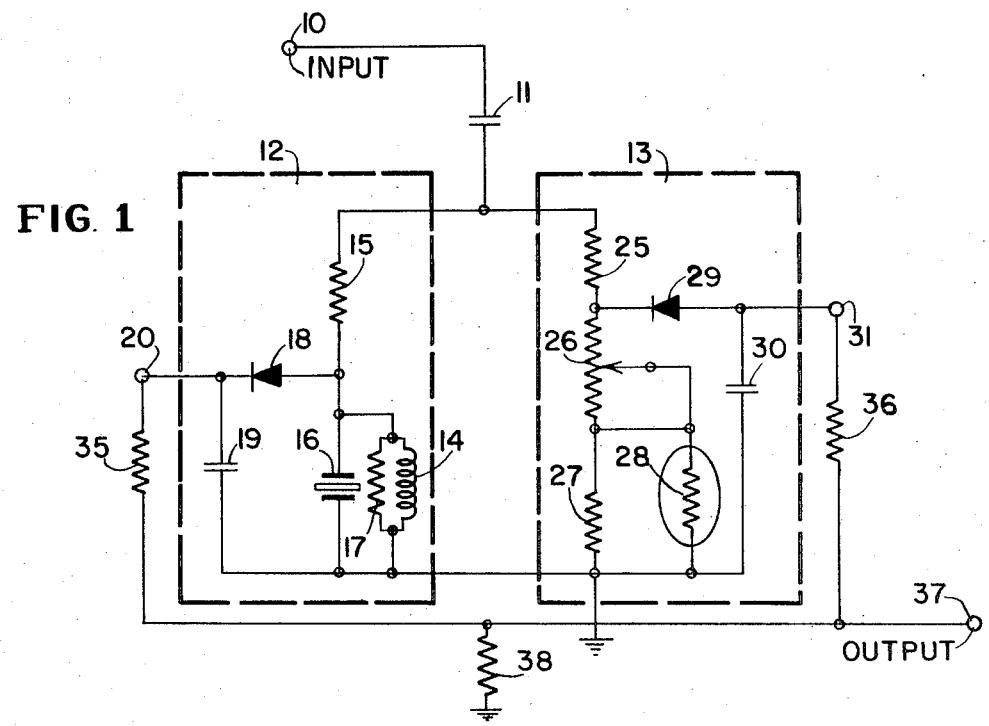
FIG. 1 is a schematic diagram showing a discriminator circuit incorporating the features of this invention.

In FIG. 1 there is shown a schematic of the circuit incorporating the features of this invention. A frequency modulated input signal having a particular center frequency is applied at terminal 10 and is coupled through direct current blocking capacitor 11 to the slope detector portion 12 and to the reference portion 13. In the slope detector portion 12, the frequency modulated input signal is coupled through resistor 15 to a piezoelectric device such as ceramic resonator 16. Resistor 17 in parallel with ceramic resonator 16 is provided to linearize the response of ceramic resonator 16 over the frequency range of the input signal. To provide a linear response over a wider input signal frequency range an inductor 14 having a suitable value may be used in parallel with resistor 17. At the particular center frequency of the frequency modulated input signal, a particular output signal, proportional to the amplitude of the input signal will be developed across ceramic resonator 16. The amplitude of the output signal developed across resonator 16 will vary about this particular output signal in proportion to variations in the frequency of the modulated input signal. The output signals are rectified by rectifier 18 and filtered in capacitor 19, thereby developing a positive first output voltage at terminal 20 which varies in proportion to the modulated frequency. Input signals coupled to reference portion 13 are coupled through resistor 25 to the series combination of potentiometer 26, resistor 27 and thermistor (negative temperature coefficient resistor) 28 in parallel with resistor 27. Output signals developed across potentiometer 26, resistor 27, and thermistor 28 are proportional to the amplitude of the frequency modulated input signal. These output signals are rectified by diode 29 and filtered by capacitor 30 to develop a negative second output voltage at terminal 31 which is proportional to the amplitude of the frequency modulated input signal. The slope detector portion 12 and the reference portion 13 have circuit values which are selected such that the first and second output signals are equal in amplitude at the particular center frequency of the input signal. The first and second output voltages or signals at terminals 20 and 31 are coupled through resistors 35 and 36, respectively, to output 37, where they combine across resistor 38 to produce a resultant output voltage which varies in proportion to the modulation of the frequency modulated input signals, and has a zero voltage level at the particular center frequency of the input signal. Variations in amplitude of the input signal at the particular center frequency, due to supply voltage variations, will result in variations in amplitude of the first and second output signals which are equal in amplitude but opposite in sign. The resultant output at terminal 37, will, therefore, remain at a zero voltage level with variations i supply voltage. Potentiometer 26 in reference portion 13 is provided to allow variations in the second output voltage in order to compensate for variations in component tolerances, and provide an exact zero voltage level at terminal 37 when the particular center frequency of the input signal is present at input terminal 10.

Figure 2:
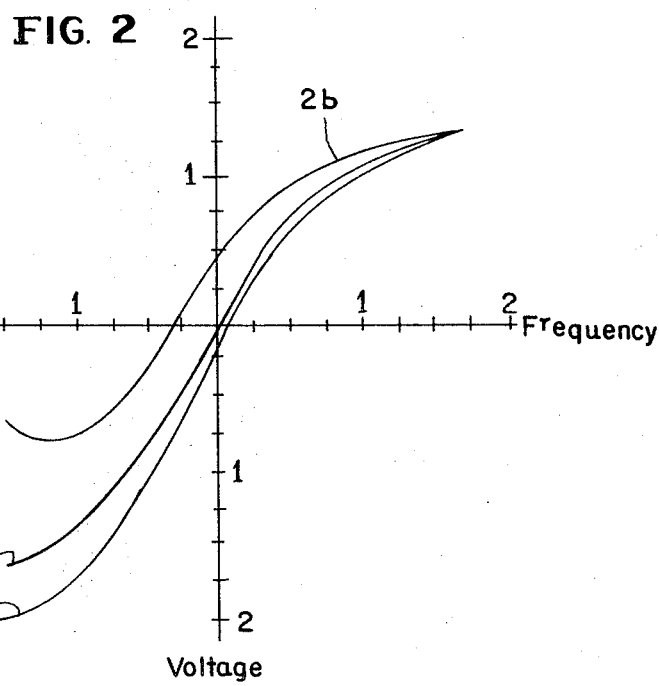
FIG. 2 is a set of curves showing the improvement in linearity achieved by the circuit of this invention.

In FIG. 2 2a represents the voltage at terminal 37 versus frequency of the input signal at terminal 10 at a temperature of +25° C., with thermistor 28 removed from reference portion 13. Curves 2b and 2c represent the same measurements as curve 2a but at temperatures of −30°C., and +60° C., respectively. As can be seen from the curves, variations in temperature seriously affect the linearity and response of the ceramic resonator in the discriminator resulting in a nonlinear variation in output voltage with modulation of the input signal. This causes an undesired severe distortion in the stages of the receiver following the discriminator, and in the audio output. The addition of the thermistor 28 to reference portion 13 provides a reference voltage at terminal 31 which compensates for the affects of temperature on ceramic resonator 16. With thermistor 28 added to the circuit, the curves of voltage at terminal 37 versus input frequency at terminal 10, at temperatures of −30° C. and +60° C. will look like the curve based on measurements made at +25° C., which is shown by curve 2a.

It can be seen that this invention provides a simple circuit for obtaining a zero voltage level at the output of a slope detector type discriminator. The zero voltage level at the output, at the particular center frequency of the input signal, is substantially independent of variations in supply voltage. In addition, the discriminator output remains linear with variations in temperature over the frequency range of interest.

I claim:

1. A discriminator for the detection of a frequency modulated signal having a particular center frequency including in combination, input means for receiving the signal, a first discriminator portion coupled to said input means and including piezoelectric means responsive to said frequency modulated signal to develop a first output signal varying in accordance with the frequency of said frequency modulated signal, said piezoelectric means being responsive to variations in temperature to vary the first output signal in accordance therewith, a second reference portion coupled to said input means and responsive to said frequency modulated signal to develop a second output signal, said second output signal being substantially independent of the frequency of said frequency modulated signal, said second reference portion including first circuit means being responsive to variations in temperature to vary said second output signal in accordance therewith, output means coupled to said first and second portions for combining said first and second output signals to cancel said first and second output signal variations due to temperature and to develop a resultant signal of varying amplitude proportional to the modulation of the frequency modulated signal and substantially independent of variations in temperature.

2. The discriminator of claim 1 wherein said output means includes first and second resistance means coupled together and to said first and second portions, and third resistance means coupled to said first nd second resistance means and to a reference potential.

3. The discriminator of claim 1 wherein said first discriminator portion includes, first resistance means coupled to said input means for receiving the frequency modulated signal therefrom said piezoelectric means being coupled to said first resistance means and to a reference potential and responsive to said frequency modulated signal to develop a first signal thereacross varying in accordance with the frequency of said frequency modulated signal, said piezoelectric means being responsive to variations in temperature to vary the first signal in accordance therewith, diode means coupled to said resistance means and to said piezoelectric means, and reactance means coupled to said diode means and to the reference potential, said diode means rectifying said first signal developed across said piezoelectric means and charging said reactance means to develop said first output signal thereacross.

4. The discriminator of claim 3 wherein said piezoelectric means is a ceramic resonator.

5. The discriminator of claim 3 wherein said first discriminator portion further includes resistance means coupled in parallel with said piezoelectric means for linearizing the response of said piezoelectric means.

6. The discriminator of claim 3 wherein said first discriminator portion further includes inductance means coupled in parallel with sad piezoelectric means for widening the response of said piezoelectric means.

7. The discriminator of claim 1 for use in a frequency modulated receiver wherein the frequency modulated signal may vary in amplitude in accordance with the supply voltage of the receiver, and herein said first discriminator portion is further responsive to said variation in amplitude of said frequency modulated signal coupled thereto to vary the first output signal in accordance therewith, said second reference portion further including circuit means responsive to the amplitude of said frequency modulated signal and interacting with said first circuit means to develop a second output signal varying in accordance with the amplitude of said frequency modulated signals and in response to variations in temperature, whereby said resultant signal varies in amplitude in proportion to the modulation of the frequency modulated signal and is substantially independent of variations in temperature and supply voltage.

8. The discriminator of claim 7 wherein said second portion includes, first resistance means coupled to said input means for receiving the frequency modulated signal therefrom, second resistance means coupled to said first resistance means and to a reference potential, said first and second resistance means being responsive to the amplitude of said frequency modulated signal to develop a second signal across said second resistance means, diode means coupled to said first and second resistance means, and reactance means coupled to said diode means and to the reference potential, said diode means rectifying said second signal and charging said reactance means to develop said second output signal thereacross.

9. The discriminator of claim 8 wherein said second resistance means includes, variable resistance means and fixed resistance means serially connected, and temperature responsive resistance means coupled across said fixed resistance means, said variable resistance means enabling the voltage developed across said second resistance means to be adjusted in value, and said temperature responsive resistance means causing the voltage developed across said second resistance means to vary in accordance with temperature, so that said second output signal varies in accordance with temperature.